United States Patent [19]

Collett et al.

[11] Patent Number: 4,584,111

[45] Date of Patent: Apr. 22, 1986

[54] USE OF VINYL ADDITION COPOLYMERS TO IMPROVE QUALITY OF LUBRICATING OIL ADDITIVES

[75] Inventors: Terry L. Collett, Voorhees; Gerald Shaw, Plainfield; Terence F. Finch, Voorhees, all of N.J.

[73] Assignee: Exxon Research & Engineering Co., Florham Park, N.J.

[21] Appl. No.: 687,091

[22] Filed: Dec. 28, 1984

[51] Int. Cl.$^4$ .......................................... C10M 105/08
[52] U.S. Cl. ............................... 252/32.7 E; 252/33.4; 252/42.7
[58] Field of Search .................... 260/429.9; 252/33.4, 252/32.7 E, 42.7

[56] References Cited

U.S. PATENT DOCUMENTS

| | | | |
|---|---|---|---|
| 4,104,291 | 8/1978 | Sabol et al. | 252/32.7 E X |
| 4,215,067 | 7/1980 | Brannen et al. | 260/429.9 |
| 4,282,106 | 8/1981 | Schaap et al. | 252/32.7 E |
| 4,466,895 | 8/1984 | Schroeck | 252/32.7 E |

Primary Examiner—Patrick P. Garvin
Attorney, Agent, or Firm—R. A. Dexter; R. L. Graham

[57] ABSTRACT

Processes for the manufacture of substantially haze free lubricating oil additives such as the zinc salts of dihydrocarbyldithiophosphoric acid and calcium phenate comprising the addition of an effective amount of an acrylamide polymer as a water-in-oil emulsion after the neutralization of an oil solution of the oil soluble moiety of said additive such as the neutralization of a dihydrocarbyldithiophosphoric acid by zinc oxide whereby the resulting colloidal by-products, untreated raw materials and suspended impurities are more susceptible to subsequent separation processes, such as centrifugation and filtration.

11 Claims, No Drawings

USE OF VINYL ADDITION COPOLYMERS TO IMPROVE QUALITY OF LUBRICATING OIL ADDITIVES

This invention relates to improving manufacturing processes for the preparation of oil-soluble additives for lubricating oils. More particularly it relates to improving manufacturing processes for the preparation of zinc salts of dihydrocarbyldithiophosphoric acids as by treating the oil solution of the oil-soluble additive to prevent the formation of haze in additive product after mechanical solids separation.

BACKGROUND OF THE INVENTION

The manufacturing processes involving the formation of lubricating oil additives frequently involve the reaction of at least two reagents in an oil diluent-solvent which results in an oil solution of the additive. This solution frequently is hazy due to the presence of difficulty removable reaction products, impurities and/or unreacted reagents which haze must be reduced to market acceptable levels prior to sale or incorporation into the lubricating oil.

Representatives of such additives are sulfonate salts, calcium phenate and salts of dihydrocarbyldithiophosphic acids which are useful in automotive oils, industrial oils, hypoid gear oils, and automatic transmission fluids, to impart dispersancy, oxidation resistance, extreme pressure properties, corrosion resistance, and detergency to the oil.

The manufacture of satisfactorily clear, odorless, and stable salts of dihydrocarbyldithiophosphoric acids and in particular the zinc salt has been found to be particularly difficult in the past and sensitive to a variety of processing conditions. While many process improvements have been made, the products of current processes tend to be hazy. The haze does not appear to harm engines or processing equipment. Since the haze in the product can be masked by blending, the hazy zinc product can be blended into finished oils or multiadditive packages. However, the hazy zinc dehydrocarbyl dithiophosphate product cannot be sold in a concentrate or single additive package and when blended into mixed additive packages contributes to reduced shelf life of the package.

U.S. Pat. No. 3,562,306 teaches the use of zinc nitrate, zinc chloride, zinc sulfate and the like to promote the reaction between zinc oxide and the dihydrocarbyl dithiophosphoric acid. U.S. Pat. No. 3,290,347 teaches the use of water soluble fatty acids and water soluble metal salts of fatty acids to accelerate the reaction between the metal compound and the dithiophosphoric but both of these approaches have been reported to suffer the disadvantage that the colloidal zinc compound particle haze will form in the presence of these accelerants.

According to U.S. Pat. No. 4,215,067 this disadvantage of haze formation is reduced if not overcome by addition of a surface active agent to the reaction mixture at or before the neutraliation of the dihydrocarbyl dithiophosphoric acid with the zinc compound to prevent or minimize have formation. Typically, the current techniques for current production still use the procedures of U.S. Pat. No. 4,377,527 which filters or centrifuges the zinc product to remove the residual solids (col. 4, lines 29–30).

Polyacrylamide (PAM)-treated perlite has been used in the filtration of zinc dialkyl dithiophosphate (ZDDP) and other lube oil additives with the offsetting results that although the purity of ZDDP increased, the filtration rate when down ("EFFECT OF SURFACTANTS ON THE PROPERTIES OF PERLITIC POWDER DURING THE FILTRATION OF ADDITIVES TO OILS" by L. I. Rudenko, V. Yu. Tretinnik, N. N. Kruglitskii, and G. I. Sergeev (All-Union Sci.-Res. Design-Constr. Inst. of Petr. Refining & Petrochem. Ind., Keiv, USSR) *Khim. Tekhnol. (Kiev)* #1:16–18 (1978)).

PAM has also been used: to break oil-clay-water emulsions ("ACTION OF POLYACRYLAMIDE ON THE STABILITY OF A CLAY SUSPENSION IN TRANSFORMER OIL" by N. N. Kruglitskii and I. N. Poraiko *Ukr. Khim. Zh.* 40#6:654–655 (1975)); to aggregate iron in substantially water-free used lubricating oil (Jap. Published Patent Application No. 53-34806 of 1978); and, to dewater a petroleum oil-water-solids sludge prior to filtration (U.S. Pat. No. 4,417,976 col. 2, line 13 to col. 3, line 33).

Unfortunately, none of these references suggest a means to improve the mechanical removal of unconsumed reagents and reaction byproduct solids from an oil solution of a salt of an organic moiety to provide a haze free lubricating oil additive solution.

Accordingly, it appears a need still remains for producing substantially haze-free lubricating oil additives such as oil solutions of zinc dihydrocarbyl dithiophosphate.

SUMMARY OF THE INVENTION

It has been discovered that the introduction of at least a flocculating amount of a water-in-oil emulsion of a vinyl addition macromolecular polymer which has been obtained by polymerizing or copolymerizing, for example, acrylamide, acrylic acid and/or its salts or esters of acrylic acid or methacrylic acid specially modified by choice of the alcohol component, which may be, for example, an aminoalcohol into the inert hydrocarbon diluent utilized as the reaction medium for the production of a lubricating oil additive, e.g. the zinc salts of a dihydrocarbyldithiophosphoric acid prior to mechanical removal of the insolubles resulting from said reaction results in a haze free solution of said additive.

It has also been found that the presence of from 0.5 to 6, preferably 2 to 5, weight percent of water based on the total weight of the reaction medium futher facilitates the mechanical removal of the insolubles.

Particularly useful are anionic polyacrylamides such as those having a molecular weight ($\overline{M}w$) of 5 to 10 millions and an anionic charge density of about 25%, cationic polyacrylamides such as those having a ($\overline{M}w$) of from 4 to 8 millions with cationic charge density of about 60% and mixtures thereof.

Thus in accordance with the objects of this invention there has been provided a process for the production of an oil solution of an oil-soluble lubricating additive comprising the step of introducing at least a flocculating amount of a water soluble vinyl addition macromolecular polymer based on the weight of the total insolubles into the hydrocarbon oil reaction system prior to mechanical clarification as a water-in-oil emulsion into said system containing at least 0.1 weight percent water.

DETAILED DESCRIPTION OF THE INVENTION

Briefly, the zinc dihydrocarbyl dithiophosphate compounds processed according to this invention are made by reacting phosphorus pentasulfide with an appropriate hydrocarbyl monohydroxy compound or mixture of compounds to form a dihydrocarbyl dithiophosphoric acid. The dihydrocarbyl dithiophosphoric acid is then neutralized with zinc oxide. Water of reaction is generated in the amount of about 2 weight percent of the reaction system and removed prior to mechanical separation to remove excess solids. In the process of this invention, the water-in-oil emulsion of the macromolecular polymer is added to the reaction mixture after the neutralization of the dihydrocarbyl dithiophosphoric acid with the zinc compound to facilitate and improve the mechanical removal of the reaction produced insolubles so as to prevent or minimize haze in the oil solution of the additive.

The macromolecular polymers useful in the process of the invention are water-soluble vinyl addition polymers which have obtained by polymerizing or copolymerizing, for example, acrylamide, acrylic acid and/or its salts or esters of acrylic acid or methacrylic acid specially modified by choice of the alcohol component, which may be for example, an aminoalcohol. The flocculants moreover differ in respect of their electrical charge (i.e. they may be cationic, anionic or electrically neutral) and in respect of their degree of polymerization. Preferred are the copolymers of acrylamide.

Useful water-soluble macromolecular polymers have molecular weights ranging from 500,000 to 20 millions with those of 4 to 10 millions preferred.

The polymers are employed in the form of water-in-oil emulsions containing from 10–50, more usually 20–30, weight percent of polymer with the remainder petroleum distillates and water. The macromolecular polymer-water gel provided by these water-in-oil emulsions generally have a particle size ranging from 0.5 to 50, preferably 1 to 20, microns which appear to relate to the agglomeration efficacy of these systems in the clarification process according to this invention. Although the reasons for this is not fully understood, it is suspected that the presence of 2 to 6 weight percent water advantageously modifies the viscosity of the polymer water gel particles whereby the agglomeration efficacy toward the insolubles of the process is enhanced.

Particularly useful macromolecular copolymers include both the anionic and cationic types. The former is represented by $5\text{--}10\times 10^6$ molecular weight, 25% anionic charge density, copolymer of acrylamide commercially available as Jayfloc 805 from Exxon Chemical Americas, Houston, Tex. as a water-in-oil emulsion containing 25% by weight of copolymer, 25% by weight of petroleum distillates with the balance being substantially water. The copolymer can be illustrated by the formula

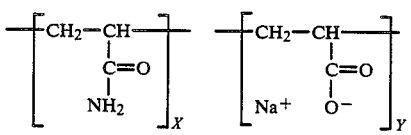

wherein X ranges from 0.7–0.8, Y ranges from 0.2 to 0.3 and $X+Y=1$.

This copolymer is for the purpose of this disclosure indicated as an acrylate acrylamide copolymer containing 20 to 30 mol percent of acrylate.

Representative of a cationic charge density polymer is a $4\text{--}8\times 10^6$ molecular weight 60% charge density polyacrylamide having the general moleculare structure corresponding to the formula:

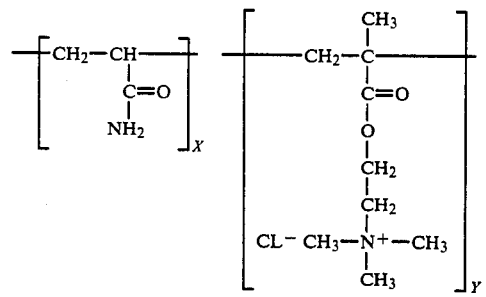

wherein X ranges from 0.2 to 0.5, Y ranges from 0.5 to 0.8 and $X+Y=1$. This copolymer is for the purpose of this disclosure indicated as a methyl chloride quaternized copolymer of di-methyl ammonium ethyl methacrylate and acrylamide containing from 20 to 50 mol percent of acrylamide.

This polymer is commercially available as Jayfloc 817 from Exxon Chemical Americas, Houston, Tex. A water-in-oil emulsion in which the polymer comprises 30% of the formulation, where the remainder is 25% petroleum distillates and 45% water.

The polyacrylamide copolymer is added to clarify the oil solution of the raw component used for specialized lubrication oil additive formulations. The polyacrylamide copolymers are nonionic, cationic or anionic.

In some instances it has been found highly advantageous to introduce the useful ionic copolymers to the reaction systems which have been treated by the introduction of a useful ionic copolymer of opposite polarity, i.e. anionic copolymer is used after introduction of a cationic copolymer or vice versa. It is preferred to treat the reactant system first with the cationic copolymers and thereafter introduce the anionic copolymers. The weight ranges based on the emulsion of the cationic copolymers to anionic copolymers range from 10:1 to 1:10, preferably 5:1 to 1:1 and optimally about 3:1. Normally the subsequent introduction of the copolymers of opposite polarity occurs no sooner than about 15 minutes after the initial introduction.

The clarifying mechanism is to increase the size of solid impurities, reaction byproducts and unreacted raw materials, primarily metal oxides and sulfides, in order to facilitate their removal. Upon completion of the reaction process, the polyacrylamide polymer(s) is mixed with the oil solution of the raw component for a period of from 0.25 to 70 hours in order to permit flocculation; i.e., the agglomeration of small solid particles into larger masses. The larger masses are then more susceptible to subsequent separation processes, such as centrifugation and filtration.

Addition of polyacrylamide polymer enhances the efficiency of the separation process, thereby improving overall quality of the lubrication oil additive component. Since component quality is critical to the efficacy of lubrication oil additive formulations, enhanced separation ultimately improves lubrication oil additive quality.

In the production of an additive such as the metal salts, e.g. zinc, antimony, etc. of a dihydrocarbyldithiophosphoric acid, the substantially hydrocarbyl monohydroxy compounds useful in the production of dihydrocarbyl dithiophosphoric acids comprise both aliphatic and aromatic monohydroxy compounds. The useful monohydroxy compounds contain from about 1 to 100 carbon atoms. Example of useful hydrocarbyl monohydroxy compounds are methanol, ethanol, propanol, isopropanol, butanol, isobutanol, tertiary butanol, pentanol, hexanol, cyclohexanol, methylcyclohexanol, decanol, eicosanol, pentacosanol, triacontanol, pentacontanol, and hectanol, etc. Examples of useful aromatic hydrocarbyl monohydroxy compounds are phenol, naphthol, hydroxy anthracene, substituted phenols such as 4-methyl phenol, dodecyl phenol, nonylphenol, etc. Phenols substituted with alkyl groups derived from the alkylation of phenol with olefinic polymers derived from $C_3$ or $C_4$ olefinic monomers can also be used. Examples of these phenols are polybutyl phenol or polypropyl phenols having molecular weights from about 300 to 1,000.

Mixtures of both aliphatic and aromatic monohydroxy compounds can also be used for the increased stability.

Phosphorus pentasulfide is useful in the process of this invention but other phosphorus sulfides such as $P_4S_7$, $P_5S_9$, etc., can be used with somewhat less successful results.

Zinc oxide is used in the production of the zinc salts of the invention for reasons of low cost, reactivity, availability, and the water, the neutralization by-product, is easily removed in processing.

In somewhat greater detail the phosphorus pentasulfide is reacted with an alcohol or mixtures of alcohols as discussed above. The reaction product is then contacted with a zinc oxide slurry in approximately stoichioetric amounts. The reaction is performed at a temperature betwen about 30° and less than about 100° C. The reaction product is added to the zinc oxide oil slurry at a rate that the temperature of the reaction does not exceed about 85° C. The reaction is continued for a period of time to insure completion. The raw product typically containing about 2 weight of water of reaction can be filtered or centrifuged in well known procedures to remove residual solids.

It is after the completion of the reaction that the emulsion of the macromolecular polymeric flocculant is initially added to the reaction system. The amount added ranges from 100 to 6,000, preferably 500 to 3,000, optimally 1500 to 2,000 parts per million (ppm) of emulsion based on the total weight of the reaction system. For further concentration of solids and enhanced recovery of product oil (as later discussed herein) the amount of emulsion added, preferably the cationic polymer emulsion, ranges from 6,000 to 30,000 ppm with an addition of 10,000 to 20,000 ppm preferred.

The addition is made by introducing the water-in-oil emulsion directly into the reaction vessel. As an aid for introducing the emulsion, for example, a mixer providing 15 horsepower per 1000 gallons of raw product provided advantageous.

At the time of the introduction of the flocculant-agglomerant water soluble macromolecular polymer, it has been found that from 0.5 to 6, preferably 2 to 5, optimally about 4, weight percent of water must be present in the raw product to enhance the mechanical removal of the undesirable impurities which otherwise would cause the haze of the oil solution of the lubricant additive.

The mechanical separation of the solids from the raw product results in an oil sludge containing from 10 to 15 weight percent solids. Remarkably the process of this invention can be utilized to mecahnically separate the sludge into a recovered product oil and sludge of from 40 to 50 weight percent solids. Treatment the oil sludge with up to 30,000 ppm typically 10,000 to 20,000 ppm of the cationic copolymer emulsion in the presence of at least about 2 weight percent of water has provided this remarkable recovery of product oil and concentrated the solids sludge reducing the volume of material which must be disposed of in an environmentally correct manner.

The process of the invention has been illustrated by the treatment of zinc dihydrocarbyl dithiophosphate salts. As must be apparent these teachings are also applicable to the production of other oil-soluble lubricating additives including metal soaps such as calcium phenol stearate and aluminum naphthenate, metal phenates such as calcium phenolate, metal alcoholates such as nickel oleate and barium octadecylate, reaction products of metal phenates and sulfur such as barium nonyl phenol sulfide, reaction products of metal phenates and phosphorous sulfides, metal phenol sulfonates and ashless dispersants such as polyisobutenyl succimides and oxazolines and borated derivatives thereof.

EXAMPLES 1–4

To illustrate the process of this invention, a test sample obtained from the production of zinc dialkyl[1] dithiophosphate which analyzed at 9 weight percent phosphorous and 9.9 weight percent zinc and containing about 2 weight percent water was utilized.

[1] The alcohols reacted with $P_2S_5$ are 35% isopentanol and 65% isobutanol.

Sample 1 was retained untreated as the control with Samples 2 through 4 treated with various additives. Each sample was agitated for 30 minutes while maintaining the temperature at 66° C. The BS&W was measured on each sample after dilution with an equal amount of heptane and 20 minutes centrifuge at 1700 rpm on a laboratory scale centrifuge. A turbidity test was thereafter run on an aliquot of each centrate derived from the BS&W test.

The results are set forth hereafter in Table I with the samples of above recorded as the corresponding examples.

TABLE I

| Example | Agglomerant at Dosage of 1500 ppm | BS & W[4] (%) | Turbidity[5] (NTU) |
|---|---|---|---|
| 1 | — | 6.5 | 480 |
| 2 | 817[1] | 7.0 | 36 |
| 3 | 806[2] | 7.2 | 70 |
| 4 | ECA[3] | 5.8 | 11 |

[1] represents Jayfloc 817
[2] represents Jayfloc 806 which is similar to Jayfloc 805 and an anionic copolymer available from Exxon Chemical Americas, Houston, TX.
[3] a developmental cationic copolymer of 80% charge density and $\overline{M}w$ ranging from 4 to 8 millions
[4] as measured by ASTMD-96 and ASTM 77.079
[5] Haze measured on centrate from BS & W via nephelometer

EXAMPLES 5-10

The test sample described in Examples 1-4 was utilized herein to illustrate the significance of the water level in the sample prior to treatment with the copolymer according to the process of the invention. The test sample was divided into six portions with that of sample designated 5 was retained untreated as the control and samples 6-10 treated with various levels of water prior to the addition of 1/10 percent by weight of Jayfloc 817. After the treatment, each sample was agitated for 30 minutes while maintaining the temperature at 66° C. The BS&W was measured on each filtrate after dilution with an equal amount of heptane and 20 minutes centrifuge at 1700 RPM on a laboratory scale centrifuge. The turbidity test was thereafter run on each BS&W test centrate. The results are set hereafter in Table II.

TABLE II

| Example | Water Added (% by Vol.) | BS & W[1] (%) | Haze[2] (NTU) |
| --- | --- | --- | --- |
| 5 | 0 | 0.8 | 198 |
| 6 | 0.25 | 0.8 | 182 |
| 7 | 0.5 | 0.8 | 158 |
| 8 | 1.0 | 1.4 | 72 |
| 9 | 2.0 | 3.0 | 86 |
| 10 | 5.0 | 5.2 | 28 |

[1] as measured by ASTMD-96 and ASTM 77.079
[2] Haze measured on centrate from BS & W via nephelometer

EXAMPLES 11-16

Again the test sample as used in Examples 1-4 was used, however it was subjected to treatment as that of Sample 1 of Example 1 and for this example the sludge was subjected to treatment to increase the solids content. The results are set forth hereafter in Table III indicating the type of copolymer used to treate the sludge and the period of agitation prior to a second centrifugation. Each sample sludge was agitated for the defined period while maintaining the temperature at 66° C. A BS&W was measured on each filtrate after dilution with an equal amount of heptane and 20 minutes centrifuge at 1700 RPM on a laboratory scale centrifuge. Again, as before, a turbidity test was thereafter run on each BS&W test centrate.

TABLE III

| Example | Jayfloc Polymer | Equivalent Dosage (gallons) | BS & W (20 mins.) | BS & W (40 mins.) | Centrate Haze (NTU) (40 mins.) |
| --- | --- | --- | --- | --- | --- |
| 11 | 817 | 0 | 100 | 100 | 6400 |
| 12 | 817 | 40 | 95 | 35 | 2240 |
| 13 | 817 | 60 | 95 | 30 | 1600 |
| 14 | 817 | 80 | 35 | 30 | 1040 |
| 15 | 805 | 60 | 95 | 35 | 3120 |
| 16 | 817/805 | 50/15 | 95 | 30 | 2160 |

What is claimed is:

1. A process for the production of an oil solution of an oil-soluble lubricating additive comprising the step of introducting at least a flocculating amount based on the weight of the total insolubles into the hydrocarbon oil reaction system prior to mechanical clarification of a water-in-oil emulsion of a water-soluble vinyl addition macromolecular polymer into said system containing at least 0.1% water.

2. The process of claim 1 wherein said polymer is ionic and said introducing is followed by the introduction of a water-in-oil emulsion of a water-soluble vinyl addition macromolecular polymer of opposite polarity to said ionic polymer.

3. The process of claim 1 wherein said polymer is a polyacrylamide of 0.5–20 millions molecular weight.

4. The process of claim 1 wherein said polymer is an anionic polyacrylamide.

5. The process of claim 1 wherein said polymer is a cationic polyacrylamide.

6. The process of claim 5 wherein said introducing is followed by the introduction of a water-in-oil emulsion of a polyacrylamide having an anionic charge in an amount ranging from 0.1 to 10 parts by weight per weight part of the emulsion containing the polyacrylamide having a cationic charge.

7. The process of claim 4 wherein said polymer is an acrylate acrylamide copolymer containing from 20 to 30 mol percent of acrylate and having a ($M_w$) ranging from 5 to 10 millions.

8. The process of claim 5 wherein said polymer is the methyl chloride quaternized copolymer of (di-methyl ammonium ethyl methacrylate) and acrylamide containing from 20 to 50 mol percent of acrylamide and having a $\overline{M}w$ ranging from 4 to 8 millions.

9. The process of claim 1 wherein said additive is a metal salt of dihydrocarbyldithiophosphoric acid and said introducing is carried out after reacting of a metal compound with said acid and prior to mechanical clarification of the reaction system and in an amount ranging from 100 ppm to 30,000 ppm based on the total weight of the system.

10. The process of claim 9 wherein there is present in said oil solution containing insolubles from 0.5 to 6 weight percent of water prior to said mechanical clarification.

11. The process of claim 9 wherein there is also added the steps of recovering an oil sludge from the step of mechanical clarification, introducing up to 30,000 parts per million (ppm) based on the weight of said sludge of said emulsion in the presence of from 2 to 6 weight percent water and recovering product oil from said sludge.

* * * * *